United States Patent

Barber et al.

[11] Patent Number: 5,953,184
[45] Date of Patent: Sep. 14, 1999

[54] TRANSVERSE SLOTTED MAGNETIC TAPE HEAD ASSEMBLY

[75] Inventors: Terry J. Barber, Louisville; Joseph E. Torline, Arvada; Anand V. Lakshmikumaran, N. Glenn, all of Colo.

[73] Assignee: Storage Technology Corporation, Louisville, Colo.

[21] Appl. No.: 08/940,185

[22] Filed: Sep. 30, 1997

[51] Int. Cl.⁶ .............................. G11B 5/265; G11B 5/187
[52] U.S. Cl. ............................................ 360/121; 360/122
[58] Field of Search ...................................... 360/113, 119, 360/121, 122, 129

[56] References Cited

U.S. PATENT DOCUMENTS

| | | | |
|---|---|---|---|
| 3,643,037 | 2/1972 | Norwood | 360/102 |
| 4,375,656 | 3/1983 | Radman, Jr. et al. | 360/122 |
| 4,479,158 | 10/1984 | Froehlich et al. | 360/130.1 |
| 4,589,042 | 5/1986 | Anderson | 360/125 |
| 4,888,657 | 12/1989 | Lacey et al. | 360/122 |
| 5,034,838 | 7/1991 | Brock et al. | 360/122 |
| 5,142,768 | 9/1992 | Aboaf et al. | 360/119 |
| 5,203,119 | 4/1993 | Cole | 451/11 |
| 5,220,473 | 6/1993 | Brock et al. | 360/121 |
| 5,264,981 | 11/1993 | Campbell et al. | 360/126 |
| 5,296,993 | 3/1994 | Aboaf et al. | 360/126 |
| 5,302,461 | 4/1994 | Anthony | 428/472 |
| 5,488,527 | 1/1996 | Komori et al. | 360/126 |
| 5,602,703 | 2/1997 | Moore et al. | 360/125 |
| 5,751,527 | 5/1998 | Sundaram et al. | 360/122 |

FOREIGN PATENT DOCUMENTS

| | | |
|---|---|---|
| 57-200922 | 12/1982 | Japan . |
| 2-306406 | 12/1990 | Japan . |

OTHER PUBLICATIONS

Richard C. Schneider, Design Methodology for High Density Read Equalization, Proceedings, SPIE–The International Society for Optical Engineering, High Density Data Recording and Retrieval Technologies, Oct. 23–24, 1995, vol. 2604, pp. 200–209.

Priyadarshee et al., Survey of digital transport servo systems, Proceedings, SPIE–The International Society for Optical Engineering, High Density Data Recording and Retrieval Technologies, Oct. 23–24, 1995, vol. 2604, pp. 210–217.

Eric Baugh et al., Head/tape interface, Proceedings, SPIE–The International Society for Optical Engineering, High Density Data Recording and Retrieval Technologies, Oct. 23–24, 1995, vol. 2604, pp. 158–164.

James A. Bain, Recording heads: write heads for high–density magnetic tape, SPIE–The International Society for Optical Engineering, High Density Data Recording and Retrieval Technologies, Oct. 23–24, 1995, vol. 2604, pp. 165–175.

(List continued on next page.)

*Primary Examiner*—David D. Davis
*Attorney, Agent, or Firm*—Brooks & Kushman P.C.

[57] ABSTRACT

A magnetic tape head assembly is provided for use with a magnetic tape storage medium. The assembly includes an interior tape head module having a magnetic gap with transverse slots on each side of the gap which substantially eliminate air and debris entrained between the module and the tape as the tape moves over the module. The assembly also includes a first exterior tape head module on one side of the interior module, the first exterior module having a magnetic gap with transverse slots on each side of the gap and a width greater than that of the interior module. The assembly still further includes a second exterior tape head module on another side of the interior module, the second exterior module having a magnetic gap with transverse slots on each side of the gap and a width greater than that of the interior module. The distances between the magnetic gaps of the modules are each approximately 0.060 inches. The distances between the magnetic gaps and the outsides of the first and second exterior modules are sufficiently long to accommodate tape wrap angle variations such that the tape adequately engages the exterior modules. The interior and exterior modules each have a cylindrical contour with a radius of approximately 0.390 inches.

7 Claims, 3 Drawing Sheets

OTHER PUBLICATIONS

Jim Eaton, Magnetic tape trends and futures, Proceedings, SPIE–The International Society for Optical Engineering, High–Density Data Recording and Retrieval Technologies, Oct. 23–24, 1995, vol. 2604, pp. 146–157.

F. William Hahn, Jr., Historical Perspective of Tape Head Contours, IBM Corporation, Tucson, Arizona.

Richard Dee and James Cates, Designing write heads for high–density tape, Data Storage, pp. 43–48, Oct. 1996.

Brahim Lekmine, Recording Channel and Data Detection in Magnetic Tape Drives, Proceedings, SPIE–The International Society for Optical Engineering, High Density Data Recording and Retrieval Technologies, Oct. 23–24, 1995, vol. 2604, pp. 176–191.

TRANSVERSE SLOTTED MAGNETIC TAPE HEAD ASSEMBLY

TECHNICAL FIELD

The present invention relates to a magnetic tape head assembly with multiple tape head modules having a contour designed for high speed, high density cartridge-type tape storage applications.

BACKGROUND ART

An important and continuing goal in the data storage industry is that of increasing the density of data stored on a medium. For tape storage systems, that goal has lead to increasing the track density in recording heads, and decreasing the thickness of the magnetic tape medium. However, the development of small footprint, higher performance tape drive systems has created various problems in the design of a tape head contour for use in such systems.

First, as is well known in the art, data storage efficiency can be reduced by entrained air causing separation between a magnetic tape and a recording head as the tape moves over the head. Such separation losses can be reduced by providing bleed slots in the head typically extending in the direction of tape travel. To adequately eliminate entrained air at higher tape speeds, the length of such slots must increase and the island widths between those slots must decrease. However, at higher tape speeds and with thinner tapes, air can still become entrained between the tape and the slot islands, thereby causing separation losses and a degradation of performance.

Moreover, for higher tape speeds, the slots must be made wider, and the slot islands therefore narrower, in order to adequately defeat entrained air. The narrower the slot islands, the more difficult they are to manufacture and the more prone they are to breakage. Additionally, as is well known in the art, in order to increase the amount of data recorded on the tape, the head may move laterally to write to and read from additional tracks on the tape. As the head moves, the slot islands can become entangled with the tape.

As is also well known in the art, in a multi-gap tape head where the read and write elements are located in adjacent gap lines, as the element width decreases, the spacing between adjacent gap lines must decrease in order to reduce/minimize azimuth alignment errors. By decreasing such "gap-to-gap" spacing, however, less space is available for placement of bleed slots having sufficient length to adequately prevent separation losses. This problem is compounded as tape speeds are increased.

It is still further well known in the art that head performance can also be affected by an improper angle at which the tape is presented to the tape head. That is, if the tape angle becomes too large or too small, the tape will not adequately contact the head, resulting in increased head to tape separation and thereby degrading performance. Conventional high performance tape drive systems have utilized precision tape paths that are part of the drive and to which the recording head is precisely aligned during manufacturing to ensure proper wrap of the tape head.

Tape storage systems, however, are increasingly using tape cartridges into which the tape head must be inserted in order to read from or write to the tape. In this case, the tape path is contained in the cartridge while the head is located in the tape drive. Such cartridges therefore introduce the problem of much greater variations in tape wrap. One solution to this problem has been to provide a tape head assembly with a stabilizer or outrigger on each end thereof to set the tape wrap on the tape head such that the tape engages the head properly.

However, the process for manufacturing a multi-gap tape head assembly requires high precision and is very time-consuming. Therefore, the addition of such stabilizers to a tape head assembly increases both the complexity and the cost of the assembly. Such stabilizers also increase the size of the assembly, which can present an additional problem given the limited size of the opening in the tape cartridges into with the tape head must be inserted.

Thus, there exists a need for a multi-gap tape head having a contour that would prevent separation losses while providing for the reduced gap-to-gap spacing required in a tape head assembly used for high density recording. Such a contour would also adequately compensate for tape wrap angle variations in tape cartridge applications, and minimize the complexity of the resulting tape head assembly.

SUMMARY OF THE INVENTION

Accordingly, a principle object of the present invention is to provide an improved contour for a multigap tape head assembly used for high speed, high density recording.

According to the present invention, then, a magnetic tape head assembly is provided for use with a magnetic tape storage medium. The assembly comprises at least one interior tape head module having a magnetic gap provided therein. The at least one interior module has a width and is provided with a transverse slot on each side of the magnetic gap, the slots acting to substantially eliminate air and debris entrained between the module and the tape as the tape moves over the module.

The assembly also comprises a first exterior tape head module having a magnetic gap provided therein. The first exterior module is disposed on one side of the at least one interior module, and has first and second sides defining a width greater than the width of at least one of the at least one interior module. The first exterior module is provided with a transverse slot on each side of the magnetic gap, the slots acting to substantially eliminate air and debris entrained between the module and the tape as the tape moves over the module.

The assembly still further comprises a second exterior tape head module having a magnetic gap provided therein. The second exterior module is disposed on another side of the at least one interior module, and has first and second sides defining a width greater than the width of at least one of the at least one interior module. The second exterior module is provided with a transverse slot on each side of the magnetic gap, the slots acting to substantially eliminate air and debris entrained between the module and the tape as the tape moves over the module.

According to one embodiment of the magnetic tape head assembly of the present invention, the distances between adjacent magnetic gaps of the at least one interior module and exterior modules are each approximately 0.060 inches, and the distance between the magnetic gap and the first side of the first exterior module and the distance between the magnetic gap and the second side of the second exterior module are at sufficiently long to accommodate tape wrap angle variations such that the tape adequately engages the exterior modules. The interior and exterior modules each have a cylindrical contour with a radius of approximately 0.390 inches.

These and other objects, features and advantages will be readily apparent upon consideration of the following detailed description in conjunction with the accompanying drawings.

DETAILED DESCRIPTION OF THE INVENTION

Figure 1:
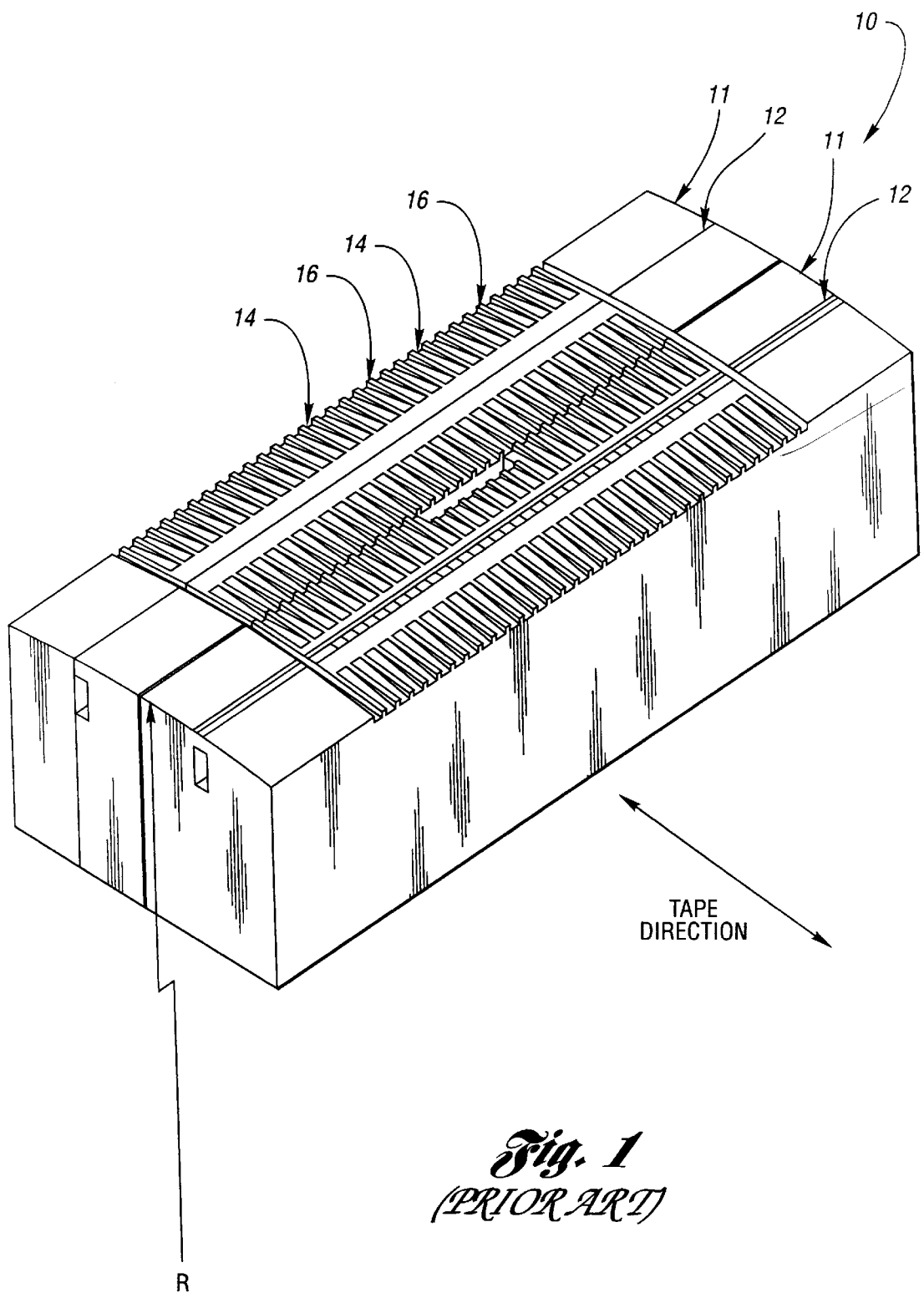
FIG. 1 is a perspective view of a prior art magnetic tape head assembly.

Referring now to FIG. 1–3, the preferred embodiment of the present invention will now be described in detail. In that regard, FIG. 1 is a perspective view of a prior art tape head assembly, denoted generally by reference numeral 10. As seen therein, tape head assembly (10) includes two tape head modules (11), each containing a magnetic gap (12), which may be provided for either read or write purposes as desired. As also seen therein, tape travel over tape head assembly (10) may be bi-directional and is denoted by the arrows labeled "TAPE TRAVEL".

As previously described, for proper performance, tape head assembly (10) must make contact with a tape (not shown) traveling thereover. More specifically, the contour of tape head assembly (10) must act to bring the tape in contact with the surface of tape head assembly (10) in the region of the magnetic gap (12). This must be accomplished at high recording speeds, such as 2 m/s and higher. As is well known in the art, the contour of the surface of tape head assembly (10) is typically cylindrical with a radius (R) on the order of 0.790 inches.

As the tape moves over tape head assembly (10), air can become entrained between the tape and the tape head assembly (10), leading to separation losses. To help prevent such separation, tape head assembly (10) is provided with a plurality of bleed slots (14) extending in the direction of tape travel. The length of slots (14) must be increased as tape speed increases.

As also previously described, however, for a tape head assembly (10) having multiple tape head modules (11) of the type depicted in FIG. 1, as tape speed increases and gap-to-gap spacing decreases, the contour of tape head assembly (10) is no longer capable of adequately preventing separation losses. That is, space requirements on such a tape head assembly (10) do not allow for providing slots (14) with sufficient length to defeat entrained air. Moreover, air can still be entrained in the regions between slots (14), referred to as "island" (16), allowing the tape to fly in these regions. This problem is compounded for very thin tape, and acts to prohibit very close contact between the tape and the surface of tape head assembly (10), thereby degrading the performance, especially at high recording densities.

As also previously described, the contour of tape head assembly (10) must be able to compensate for any variation in the angle at which the recording tape is presented to, or wraps, the tape head assembly (10). Prior art tape systems may utilize a precision tape path to ensure proper wrap of tape head assembly (10). However, tapes have been increasingly packaged in cartridges (not shown) which contain the tape path and into which tape head assembly (10) must be inserted for operation. This technique introduces much greater variation in the wrap of the tape head assembly (10).

To combat this problem, prior art tape systems may utilize stabilizers (not shown) on the outside of the tape head assembly (10) to compensate for wrap variation. This solution, however, greatly complicates the head assembly process and presents space problems due to the size of the tape head assembly (10) compared to the opening in the tape cartridge.

Moreover, a multi-gap tape head assembly (10) is composed of several tape head modules (11) of the type depicted in FIG. 1. The process of assembling these individual modules (11) into a tape head assembly (10) requires high precision and is a very time-consuming process. Thus, it is desirable to design a tape head contour that minimizes the complexity of the assembly process. This is best accomplished by minimizing the number of tape head modules and/or components in the tape head assembly and by allowing for maximum tolerances in the assembly of the required modules. Current contour designs, such as those using the stabilizers described above, do not meet these requirements.

Figure 2A:
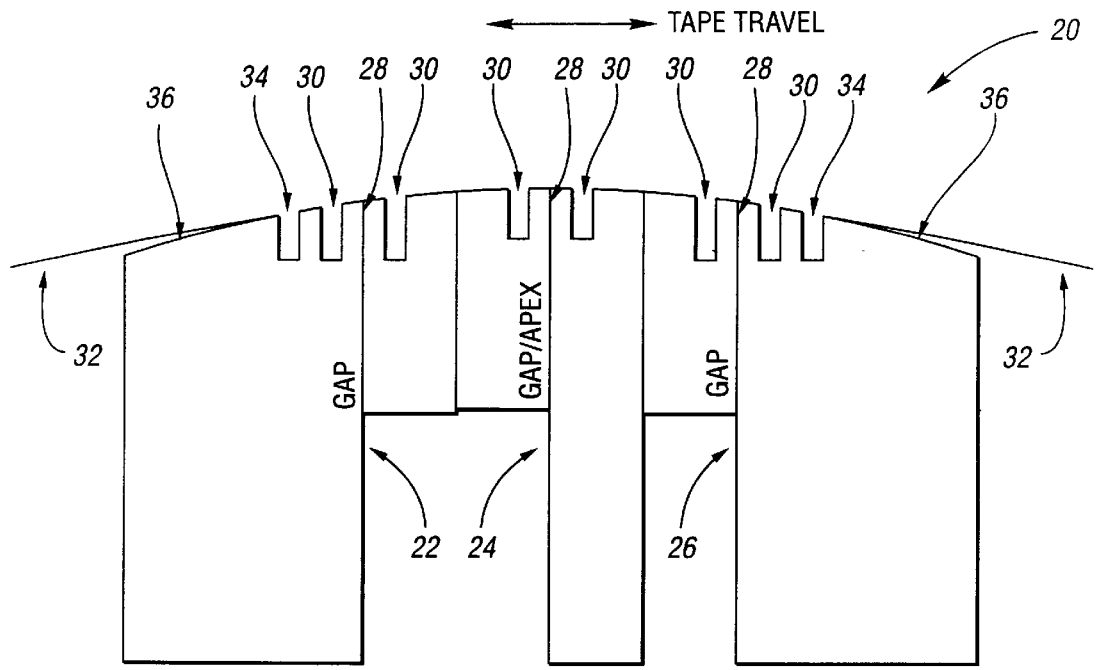
FIGS. 2a and 2b are side and perspective views, respectively, of one embodiment of the magnetic tape head assembly of the present invention.
Figure 2B:
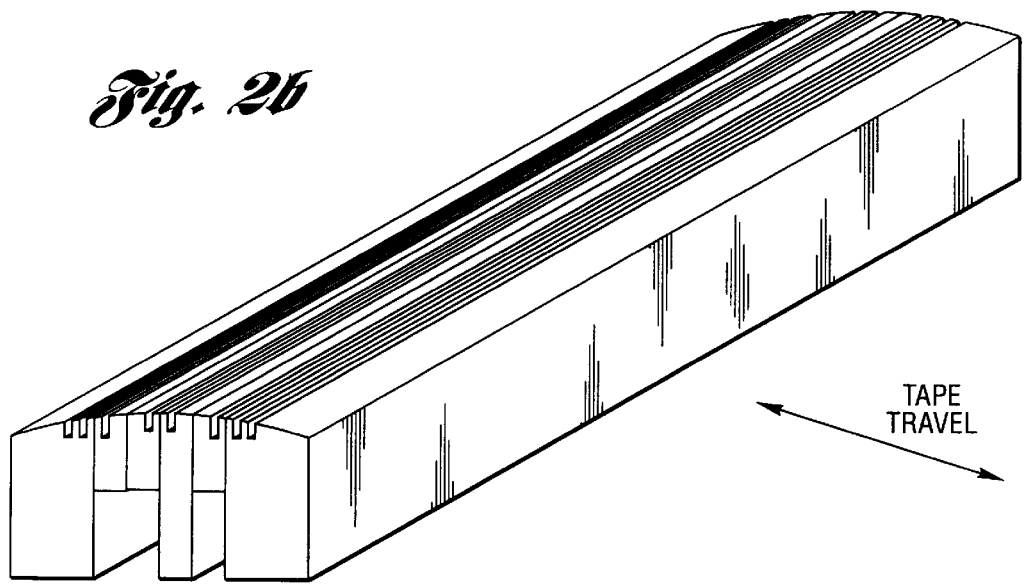

Referring next to FIGS. 2a and 2b, side and perspective views, respectively, of one embodiment of a tape head assembly of the present invention are shown, denoted generally by reference numeral 20. As will be described in greater detail below, tape head assembly (20)—includes various features that combine to create a robust, high performance tape head design.

As seen therein, tape head assembly (20) comprises three tape head modules (22, 24, 26), including interior module (24) and exterior modules (22, 26). In this embodiment, tape head assembly (20) contains three magnetic gaps (28), each of which could contain read elements only, write elements only, or a combination thereof. Therefore, tape head assembly (20) could be constructed with various read and write configurations. However, tape head assembly (20) is preferably a "read-write-read" assembly. That is, exterior module (22) comprises a read module, interior module (24) comprises a write module, and exterior module (26) comprises a read module.

Still referring to FIGS. 2a and 2b, each tape head module (22, 24, 26) includes a magnetic gap (28) for reading, writing, or a combination thereof, as desired. In that regard, in the embodiment shown, the apex of interior module (24) is located at the gap (28) of interior module (24), while the apex of the exterior modules (22, 26) are located at a distance of 0.044 inches from their respective gaps (28) toward interior module (24). As is well known in the art, each tape head module (22, 24, 26) includes multiple read or write elements along its respective magnetic gap (28). As the element widths decrease, the spacing between gaps (28) of modules (22, 24, 26) must be reduced to prevent azimuth alignment errors. In the embodiment depicted in FIGS. 2a and 2b, the spacing between gaps (28) is preferably 0.060 inches. With such spacing between gaps (28), bleed slots cannot be provided with sufficient length to eliminate entrained air, particularly at higher tape speeds and with use of thinner tape.

To solve this problem, as seen in FIGS. 2a and 2b, the contour of each module (22, 24, 26) is provided with at least one transverse slot (30) on each side of their respective gaps (28), instead of the bleed slots (14) depicted in FIG. 1. The centerline of each transverse slot (30) is preferably located 0.0105 inches from its respective gap (28). Each transverse slot (30) is also preferably provided with a width in the direction of tape travel of 0.007 inches and a depth of at least 0.015 inches. Such transverse slots (30) therefore easily fit into the limited real estate on the surface of each module (22, 24, 26).

In addition, since the tape needs to be "wrapped" just enough to "cover" the transverse slots (30), replacing the bleed slots (14) of FIG. 1 with transverse slots (30) allows for greater tolerances in the assembly of tape head module (20), and makes tape head module (20) less sensitive to tape wrap variations. Moreover, in contrast to the bleed slots (14) of FIG. 1, transverse slots (30) eliminate entrapped air uniformly across the entire width of tape (32) as it travels across modules (22, 24, 26), regardless of the direction of tape travel, which is again denoted by the arrows labeled "TAPE TRAVEL".

As also seen in FIGS. 2a and 2b, exterior modules (22, 26) are preferably provided with an additional transverse slot (34) on one side of their respective gaps (28). In the absence of slots (34), as moving tape (32) first comes into contact with tape head assembly (20), debris from the surface of tape (32) can be trapped in transverse slots (30), thereby defeating the ability of transverse slots (30) to eliminate entrained air between tape (32) and modules (22, 24, 26). Transverse slots (34) are therefore primarily provided to trap such debris and leave transverse slots (30) free to eliminate entrained air. However, like transverse slots (30), transverse slots (34) also aid in minimizing head to tape separation.

Still referring to FIGS. 2a and 2b, the centerlines of transverse slots (34) on each exterior module (24, 26) are preferably located 0.0245 inches from their respective gaps (28). Each transverse slot (34) is also preferably provided with a width in the direction of tape travel of 0.007 inches, and a depth of at least 0.015 inches.

While the locations and dimensions of transverse slots (30,34) detailed above are preferable, other locations and dimensions may also be used. In that same regard, additional transverse slots (not shown) may also be provided between gaps (28) and on exterior modules (22, 26) outside transverse slots (34). The only limitation for such additional transverse slots being the available space therefor given gap (28) spacing, slot dimensions, slot spacing, and the need for the slots (30, 34) to be covered by the tape (32) when stationary. In that regard, the nominal locations of the tangent points of tape (32) on interior module (24) and on exterior modules (22, 26), such that transverse slots (30) may adequately function to defeat entrained air and debris, is preferably 0.022 inches from their respective gaps (28). In addition, the nominal locations of the tangent points of tape (32) on exterior modules (22, 26) where tape (32) first comes into contact with tape head assembly (20), such that transverse slots (34) may adequately function to defeat entrained air and debris, is preferably 0.047 inches from their respective gaps (28).

Still referring to FIGS. 2a and 2b, modules (22, 24, 26) together define a tape head assembly (20) contour with each module (22, 24, 26) being cylindrical in shape and having a radius of approximately 0.390 inches. Such a small contour radius for tape head assembly (20) achieves multiple purposes. First, it helps to minimize entrained air by creating greater contact pressure between tape (32) and tape head assembly (20). In so doing, tape (32) is brought into adequate contact with each module (22, 24, 26) of tape head assembly (20). Moreover, it provides for more tolerance in the assembly of modules (22, 24, 26), thereby making tape head assembly (20) more robust and less sensitive to variation in the tape wrap angle (or tangency) due to tape path variations, such as those encountered where tape head assembly (20) must be inserted into a tape cartridge. In that regard, the contour of tape head assembly (20) preferably provides for a nominal tape wrap angle of approximately 13.5 degrees.

Referring still to FIGS. 2a and 2b, exterior modules (22, 26) of tape head assembly (20) are wider than the interior module (24). Specifically, exterior modules (22, 26) are preferably 0.105 inches wide, while interior module (24) is preferably 0.060 inches wide. Such additional space, or "lands" (36), outside of the outermost slots (34) of exterior modules (22, 26), in combination with the smaller radius of tape head assembly (20) and transverse slots (30, 34), sufficiently accounts for variations in the tape wrap angle that the need for stabilizers is eliminated. In that regard, the contour of tape head assembly (20) provides for variations in tape wrap angle of ±2.1 degrees from the nominal value of 13.5 degrees. This makes manufacture of tape head assembly (20) easier and keeps the overall length of tape head assembly (20) to a minimum, which again aids in the use of tape head assembly (20) with tape cartridges into which tape head assembly (20) must be inserted.

Figure 3A:
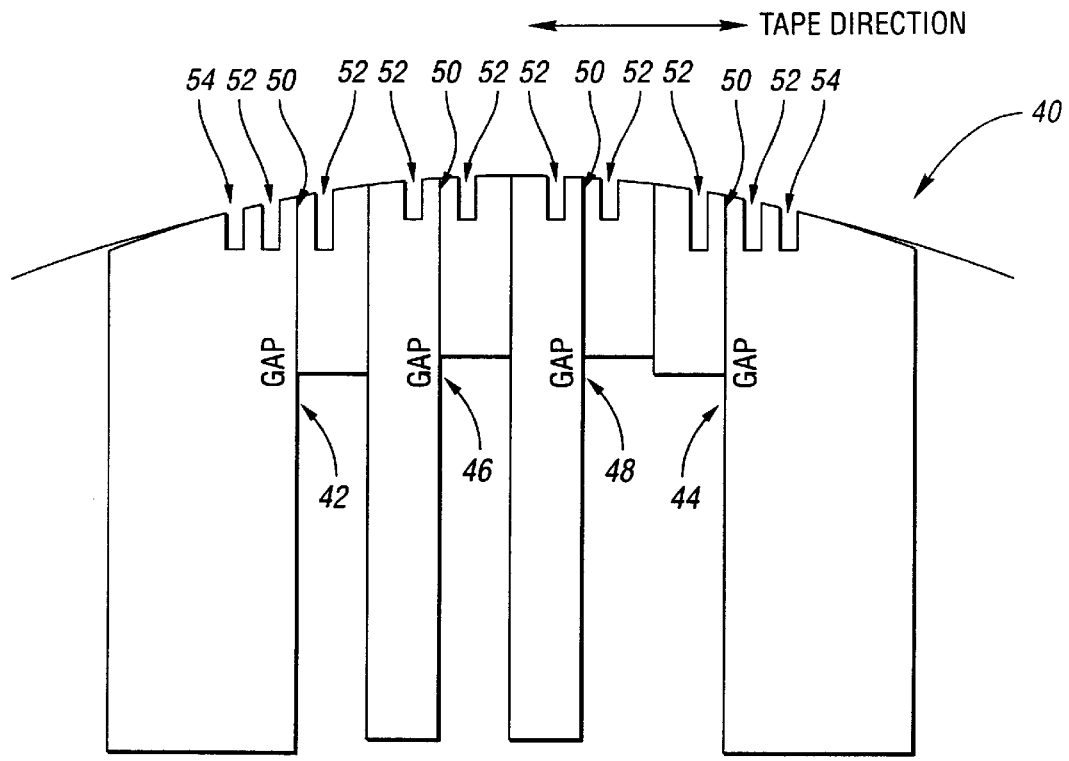
FIGS. 3a and 3b are side and perspective views, respectively, of another embodiment of a magnetic tape head assembly of the present invention.
Figure 3B:
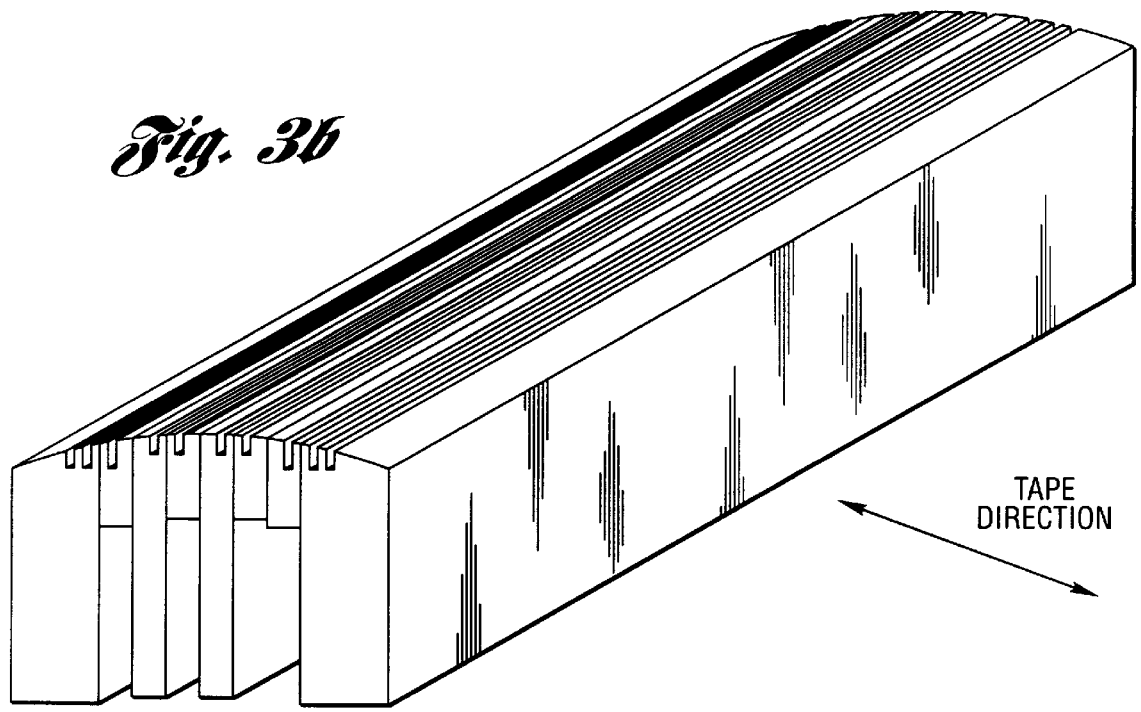

Referring finally to FIGS. 3a and 3b, side and perspective views of another embodiment of a magnetic tape head assembly of the present invention are shown, denoted generally by reference numeral 40. As seen therein, tape head assembly (40) comprises two exterior (42, 44) and two interior (46, 48) tape head modules, each provided with a magnetic gap (50). Once again, magnetic gaps (50) could contain read elements only, write elements only, or a combination thereof, as desired. As an example, in this embodiment, each of tape head modules (42, 44, 46, 48) could comprise a write module, and tape head assembly (40) could function as a servo-writer. With the exception of apex locations, dimensions of modules (42, 44, 46, 48), spacing between gaps (50), and dimensions and locations of transverse slots (52, 54) are the same as those discussed above with respect to tape head assembly (20) of FIGS. 2a and 2b.

It should be noted that the contours of tape head assemblies (20, 40) of FIGS. 2a, 2b, 3a and 3b are easily manufacturable with existing wafer, machining, and assembly processes. Moreover, as previously described, such contours provide a stable head/tape interface at high tape speeds, particularly for thin tapes, low tape tension, and high frequency recording.

As is readily apparent from the foregoing description, then, the present invention provides an improved contour for a multi-gap tape head assembly used for high speed, high density recording. More specifically, the present invention provides a multi-gap tape head assembly having a contour that prevents separation losses while providing for the reduced gap-to-gap spacing required for high density recording. The contour also adequately compensates for tape angle variations in tape cartridge applications, and minimizes the complexity of the resulting tape head assembly. As previously discussed, the magnetic tape head assembly of the present invention is suitable for use with any combination of read and/or write elements.

It is to be understood, then, that the present invention has been described in a illustrative manner and that the terminology which has been used is intended to be in the nature of words of description rather than of limitation. As previously stated, many modifications and variations of the present invention are possible in light of the above teachings. Therefore, it is also to be understood that, within the scope of the following claims, the present invention may be practiced otherwise than as specifically described.

What is claimed is:

1. A magnetic tape head assembly for use with a magnetic tape storage medium, the assembly comprising:

an interior tape head module having an interior magnetic gap provided therein, the interior module having first and second sides defining a width and being provided with a transverse slot on each side of the interior magnetic gap, the transverse slots extending transversely of the direction of motion of the tape and acting to substantially eliminate air and debris entrained between the module and the tape as the tape moves over the module;

a first exterior tape head module having a first magnetic gap provided therein, the first exterior module being disposed adjacent the first side of the interior module, the first exterior module having first and second sides defining a width greater than the width of the interior module and being provided with a transverse slot located between the first magnetic gap and the interior magnetic gap and first and second transverse slots located between the first magnetic gap and the first side of the first exterior module, the transverse slots extending transversely of the direction of motion of the tape and acting to substantially eliminate air and debris entrained between the module and the tape as the tape moves over the module; and a second exterior tape head module having a second magnetic gap provided therein, the second exterior module being disposed adjacent the second side of the interior module, the second exterior module having first and second sides defining a width greater than the width of the interior module and being provided with a transverse slot located between the second magnetic gap and the interior magnetic gap and first and second transverse slots located between the second magnetic gap and the second side of the second exterior module, the transverse slots extending transversely of the direction of motion the tape and acting to substantially eliminate air and debris entrained between the module and the tape as the tape moves over the module;

wherein the distances between adjacent magnetic gaps of the interior and exterior modules are each approximately 0.060 inches, the distance between the first magnetic gap and the first side of the first exterior module and the distance between the second magnetic gap and the second side of the second exterior module are each sufficiently long to accommodate tape wrap angle variations such that the tape adequately engages the exterior modules, and the interior and exterior modules each have cylindrical contours with a radius of approximately 0.390 inches;

wherein each of the transverse slots are provided with a width of approximately 0.007 inches and a depth of approximately 0.015 inches;

wherein area between the first magnetic gap and the first side of the first exterior tape head module and area between the second magnetic gap and the second side of the second exterior tape head module each comprise a tape land, each tape land being provided with a length sufficient to establish a tape wrap angle between a tape and the, exterior modules of between 11.4 and 15.6 degrees, wherein the length of each tape land is approximately 0.047 inches.

2. The magnetic tape head assembly of claim 1 wherein the interior tape head module includes a write element.

3. The magnetic tape head assembly of claim 1 wherein the first and second exterior tape head modules each include a read element.

4. The magnetic tape head assembly of claim 1 wherein the transverse slots on each side of the magnetic gaps of the interior and exterior modules each have a centerline located approximately 0.0105 inches from their respective magnetic gap.

5. A magnetic tape head assembly for use with a magnetic tape storage medium, the assembly comprising:

a first interior tape head module having a first interior magnetic gap provided therein, the first interior module having first and second sides defining a width and being provided with a transverse slot on each side of the first interior magnetic gap, the transverse slots extending transversely of the direction of motion of the tape and acting to substantially eliminate air and debris entrained between the module and the tape as the tape moves over the module;

a second interior tape head module having a second interior magnetic gap provided therein, the second interior module having first and second sides defining a width and being provided with a transverse slot on each side of the second interior magnetic gap, the transverse slots extending transversely of the direction of motion of the tape and acting to substantially eliminate air and debris entrained between the module and the tape as the tape moves over the module;

a first exterior tape head module having a first exterior magnetic gap provided therein, the first exterior module being disposed adjacent the first side of the first interior module, the first exterior module having first and second sides defining a width greater than the widths of the first and second interior module and being provided with a transverse slot located between the first exterior magnetic gap and the interior magnetic gap and first and second transverse slots located between the first exterior magnetic gap and the first side of the first exterior module, the transverse slots extending transversely of the direction of notion of the tape and acting to substantially eliminate air and debris entrained between the module and the tape as the tape moves over the module; and a second exterior tape head module having a second exterior magnetic gap provided therein, the second exterior module being disposed adjacent the second side of the second interior module, the second exterior module having first and second sides defining a width greater than the widths of the first and second interior modules and being provided with a transverse slot located between the second exterior magnetic gap and the interior magnetic gap and first and second transverse slots located between the second exterior magnetic gap and the second side of the second exterior module, the transverse slots extending transversely of the direction of motion of the tape and acting to substantially eliminate air and debris entrained between the module and the tape as the tape moves over the module;

wherein the distances between consecutive magnetic gaps of the interior and exterior modules are each approximately 0.060 inches, the distance between the first exterior magnetic gap and the first side of the first exterior module and the distance between the second exterior magnetic gap and the second side of the second exterior module are each sufficiently long to accommodate tape wrap angle variations such that the tape adequately engages the exterior modules, and the interior and exterior modules each have a cylindrical contour with a radius of approximately 0.390 inches;

wherein each of the transverse slots are provided with a width of approximately 0.007 inches and a depth of approximately 0.015 inches;

wherein area between the first exterior magnetic gap and the first side of the first exterior tape head module and between the second exterior magnetic gap and the second side of the second exterior tape head module each comprise a tape land, each tape land being provided with a length sufficient to establish a tape wrap angle between a tape and the exterior modules of between approximately 14.3 and 18.5 degrees, wherein the length of each tape land is 0.047 inches.

6. The magnetic tape head assembly of claim 5 wherein the interior and exterior tape head modules each include a write element.

7. The magnetic tape head assembly of claim 1 wherein the transverse slots on each side of the magnetic gaps of the interior and exterior modules each have a centerline located approximately 0.0105 inches from their respective magnetic gap.

* * * * *